US008744096B2

(12) United States Patent
Aiso et al.

(10) Patent No.: US 8,744,096 B2
(45) Date of Patent: Jun. 3, 2014

(54) DIGITAL AUDIO MIXER

(75) Inventors: Masaru Aiso, Hamamatsu (JP); Masaaki Okabayashi, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 297 days.

(21) Appl. No.: 13/050,847

(22) Filed: Mar. 17, 2011

(65) Prior Publication Data

US 2011/0228956 A1 Sep. 22, 2011

(30) Foreign Application Priority Data

Mar. 19, 2010 (JP) ................................ 2010-065242

(51) Int. Cl.
*H04B 1/00* (2006.01)

(52) U.S. Cl.
USPC .............................. 381/119; 381/107; 700/94

(58) Field of Classification Search
USPC ........ 381/61, 58, 119, 98–109; 700/94; 369/4
See application file for complete search history.

(56) References Cited

U.S. PATENT DOCUMENTS

| | | | | |
|---|---|---|---|---|
| 5,060,272 | A * | 10/1991 | Suzuki | 381/119 |
| 6,153,994 | A | 11/2000 | Royer et al. | |
| 7,684,573 | B2 * | 3/2010 | Makino et al. | 381/119 |
| 2004/0028247 | A1 | 2/2004 | Aiso et al. | |
| 2008/0078283 | A1 * | 4/2008 | Kato et al. | 84/625 |

FOREIGN PATENT DOCUMENTS

| | | | |
|---|---|---|---|
| JP | 11-97218 | A | 4/1999 |
| JP | 2005-252328 | A | 9/2005 |
| JP | 2008-085830 | A | 4/2008 |
| JP | 2011-066847 | A | 3/2011 |

OTHER PUBLICATIONS

Anonymous. (Jan. 2005). "Soundtracs DS-00 Operation Manual," Issue B, two pages.

Notice of Grounds for Rejection mailed Sep. 24, 2013, for JP Application No. P2010-065242, with English Translation, six pages.

CS 3000/CS2000 MixView Software Supplement In: "CS3000jCS2000 MixView Software Supplement", (Jan. 1, 1998), Euphonix. Palo Alto, USA, XP055064673, p. 5: "Backstop Pre Fader Listen (PFL)".

Hugh Robjohns:"Mixing consoles: Part 5".(Jan. 1, 2010) XP055064674, Retrieved from the Internet: <URL:http://www.performing-musician.com/pm>janlO(articles/technotes.htm?print=yes [retrieved on May 30, 2013] the whole document.

European Search Report mailed Jun. 6, 2013 for EP Application No. 11158590.7, 12 pages.

European Office Action mailed Mar. 17, 2014 for EP Application No. 11158590.7, four pages.

* cited by examiner

*Primary Examiner* — Xu Mei
(74) *Attorney, Agent, or Firm* — Morrison & Foerster LLP

(57) ABSTRACT

Once a human operator operates a fader knob of a desired channel downwardly toward a predetermined position, resistance force against the fader knob is generated. As the human operator further lowers the fader knob beyond another predetermined position against the resistance force, the channel is set in a CUE-ON state, so that an audio signal (pre-fader signal) of the channel can be test-listened to as a CUE signal. Then, once the human operator operates the fader knob upwardly, the CUE-ON state of the signal is canceled, so that a sound volume level of the channel can be controlled in accordance with an operating position of the fader knob.

4 Claims, 6 Drawing Sheets

DIGITAL AUDIO MIXER

BACKGROUND

The present invention relates generally to audio mixers capable of test-listening (or sound check) to an audio signal of an input channel or output channel.

The conventionally-known digital audio mixers include a plurality of channel strips provided on an operation panel, so that a human operator can use fader controls of the channel strips to control sound volume levels of audio signals of input or output channels allocated to the channel strips.

Among such conventionally-known digital audio mixers is one which has a CUE function for test-listening to an audio signal of a desired input channel or output channel. The CUE function is activated by a human operator turning on a CUE switch of any one of the channel strips. Such a digital audio mixer is constructed in such a manner that, in response to the human operator's operation of the CUE switch, an audio signal of a channel, allocated to that channel strip, is supplied to a CUE bus so that the supplied audio signal can be output, via an operator monitor output, as a CUE signal of a different route from main output signals. An example of such a digital audio mixer is disclosed in Japanese Patent Application Laid-open Publication No. 2005-252328. Because the CUE signal is of a separate route from main output signals, the main output signals of the mixer remain unaffected or uninfluenced by the CUE function. Note that the term "CUE" is used herein to refer to cue "test-listening".

In the digital mixer, the human operator often performs, before supplying an audio signal of a given channel to a main output (i.e., before increasing a sound volume level of the given channel), a series of operations of confirming the audio signal of the given channel by test-listening to the audio signal through the CUE function with the sound volume level adjusted to zero (i.e., with a corresponding fader control maintained at its lower end position) and then increase the sound volume level of the given channel by moving or operating upwardly of the fader control. During such operations, it is necessary for the human operator to perform operation of two different controls, i.e. operation of the CUE switch of the given channel and sliding operation of the corresponding fader control, and thus, much time and labor required for these cumbersome operation would undesirably lower an overall level manipulating efficiency of the digital audio mixer.

SUMMARY OF THE INVENTION

In view of the foregoing, it is an object of the present invention to provide an improved digital audio mixer which permits an enhanced operability of operation for manipulating a level of a given channel after test-listening (or sound check) to an audio signal of the given channel.

In order to accomplish the above-mentioned object, the present invention provides an improved digital audio mixer, which comprises: a plurality of channels each of which controls a level of a supplied audio signal on the basis of a level parameter and outputs the level-controlled audio signal; a plurality of fader controls to which are allocated the plurality of channels, on channel per fader control, each of the fader controls being slidingly operable one-dimensionally from a first end to a second end of a movable range thereof and drivable on the basis of a drive signal; a level change section which, in response to a position of each of said fader controls, changes a value of the level parameter of a channel, allocated to the fader control, in such a manner that the value of the level parameter of the channel becomes greater as the position of the fader approaches said first end and becomes smaller as the position of the fader approaches said second end; a mixing bus which mixes a plurality of audio signals output from the plurality of channels to thereby output a resultant mixed audio signal; a main output section which outputs, to outside the digital audio mixer, the mixed audio signal output from the mixing bus; a monitoring output section which outputs an audio signal designated as a cue signal; a resistance force generation section which, once any one of the fader controls is operated toward the second end within a predetermined range provided near the second end, drives the one fader control on the basis of the drive signal to thereby generate resistance force against operation of the one fader control; a first control section which, once any one of the fader controls is operated toward the second end beyond the predetermined range, designates, as the cue signal, the audio signal of the channel allocated to the one fader control; and a second control section which, once any one of the fader controls is operated toward the first end beyond the predetermined range, cancels designation, as the cue signal, of the audio signal of the channel allocated to the one fader control.

According to the present invention thus constructed, once a human operator operates downwardly the fader control of a desired one of the channels against the resistance force, an audio signal of the channel is output as the cue signal. Then, by the human operator operates upwardly the fader channel of the desired channel, output of the cue signal of the channel is terminated, and the sound volume level of the channel can be controlled in accordance with an operating position of the fader control. Thus, by merely operating just one fader control of a desired channel in upward and downward directions, the human operator can perform a series of operations of test-listening (sound check) to a cue signal of a given channel (i.e., test-listening designating operation) and then start sound volume level adjustment of a main output signal of the channel (i.e., sound volume level adjusting operation), with increased ease and efficiency.

According to another aspect of the present invention, there is provided an improved digital audio mixer, which comprises: a plurality of input channels each of which controls a level of a supplied audio signal on the basis of a level parameter and outputs the level-controlled audio signal; a plurality of fader controls slidingly operable one-dimensionally from a first end to a second end of a movable range thereof and drivable on the basis of a drive signal; a level change section which, in response to a position of each of fader controls, changes a value of the level parameter of a channel, allocated to the fader control, in such a manner that the value of the level parameter of the channel becomes greater as the position of the fader approaches said first end and becomes smaller as the position of the fader approaches said second end; a plurality of mixing buses each of which mixes a plurality of audio signals output from the plurality of channels to thereby output a resultant mixed audio signal; a plurality of output channels corresponding to the plurality of mixing buses, each of the output channels controlling a level of the audio signal, supplied from a corresponding one of the mixing buses, on the basis of a level parameter and outputs the level-controlled audio signal, the output channels being allocated to the fader controls, one output channel per fader control; a main output section which outputs, to outside the digital audio mixer, the audio signals output from the plurality of output channels; a monitoring output section which outputs an audio signal designated as a cue signal; a resistance force generation section which, once any one of the fader controls is operated toward the second end within a predetermined range provided near the second end, drives the one fader control on the basis of the drive signal to thereby generate resistance force against operation of the one fader control; a first control section which, once any one of the fader controls is operated toward the second end beyond the predetermined range, designates, as the cue signal, the audio signal of the channel allocated to the one fader control; and a second control section which, once any one of the fader controls is operated toward the first end beyond the predetermined range, cancels designation, as the cue signal, of the audio signal of the channel allocated to the one fader control. In this case too, the human operator can perform a series of operations of test-listening (sound check) to a cue signal of a given channel (i.e., test-listening designating operation) and then start sound volume level adjustment of a main output signal of the channel (i.e., sound volume level adjusting operation) with increased ease and efficiency, by merely operating just one fader control of the channel in upward and downward directions.

According to still another aspect of the present invention, there is provided an improved digital audio mixer, which comprises: a plurality of channels each of which controls a level of a supplied audio signal on the basis of a level parameter and outputs the level-controlled audio signal; a plurality of fader controls to which are allocated the plurality of channels, on channel per fader control, each of the fader controls being slidingly operable one-dimensionally from a first end to a second end of a movable range thereof and drivable on the basis of a drive signal; a level change section which, in response to a position of each of said fader controls, changes a value of the level parameter of a channel, allocated to the fader control, in such a manner that the value of the level parameter of the channel becomes greater as the position of the fader approaches said first end and becomes smaller as the position of the fader approaches said second end; a mixing bus which mixes a plurality of audio signals output from the plurality of channels to thereby output a resultant mixed audio signal; a plurality of cue switches to which are allocated the channels, one channel per cue switch; a designation control section which, in response to operation of any one of the cue switches, designates, as the cue signal, the audio signal of the channel allocated to the one cue switch if the audio signal of the channel allocated to the one cue switch is not currently designated as the cue signal, but cancels designation, as the cue signal, of the audio signal of the channel allocated to the one cue switch if the audio signal of the channel allocated to the one cue switch is currently designated as the cue signal; a monitoring output section which outputs an audio signal designated as the cue signal; a mode selection section which selects any one of a first mode and a second mode; a resistance force generation section which, once any one of the fader controls is operated toward the second end within a predetermined range, provided near the second end, while the second mode is selected, drives the one is fader control on the basis of the drive signal to thereby generate resistance force against operation of the one fader control; a first control section in operation while said second mode is selected, which, once any one of said fader controls is operated toward said second end beyond the predetermined range, designates, as the cue signal, the audio signal of the channel allocated to the one fader control; and a second control section in operation while said second mode is selected, which, once any one of said fader controls is operated toward said first end beyond the predetermined range, cancels designation, as the cue signal, of the audio signal of the channel allocated to the one fader control. While the first mode is selected by the mode selection section, the level change section progressively changes the value of the level parameter within a range from a maximum level value to a zero level value corresponding to an entire range from the first end to the second end the level change section, but, while the second mode is selected, the level change section progressively changes the value of the level parameter in response to the operating position of the fader control as long as the operating position of the fader control is within a range closer to the first end than the predetermined range and maintains the value of the level parameter at a zero level value as long as the operating position of the fader control is within a range from the predetermined range to the second end. In this case too, the human operator can perform a series of operations of test-listening (sound check) to a cue signal of a given channel (i.e., test-listening designating operation) and then start sound volume level adjustment of a main output signal of the channel (i.e., sound volume level adjusting operation) with increased ease and efficiency, by merely operating just one fader control of the channel in upward and downward directions.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the object and other features of the present invention, its preferred embodiments will be described hereinbelow in greater detail with reference to the accompanying drawings, in which.

DETAILED DESCRIPTION

Hereinbelow, a description will be given about a digital mixer that is an embodiment of a digital audio mixer of the present invention.

Figure 1:
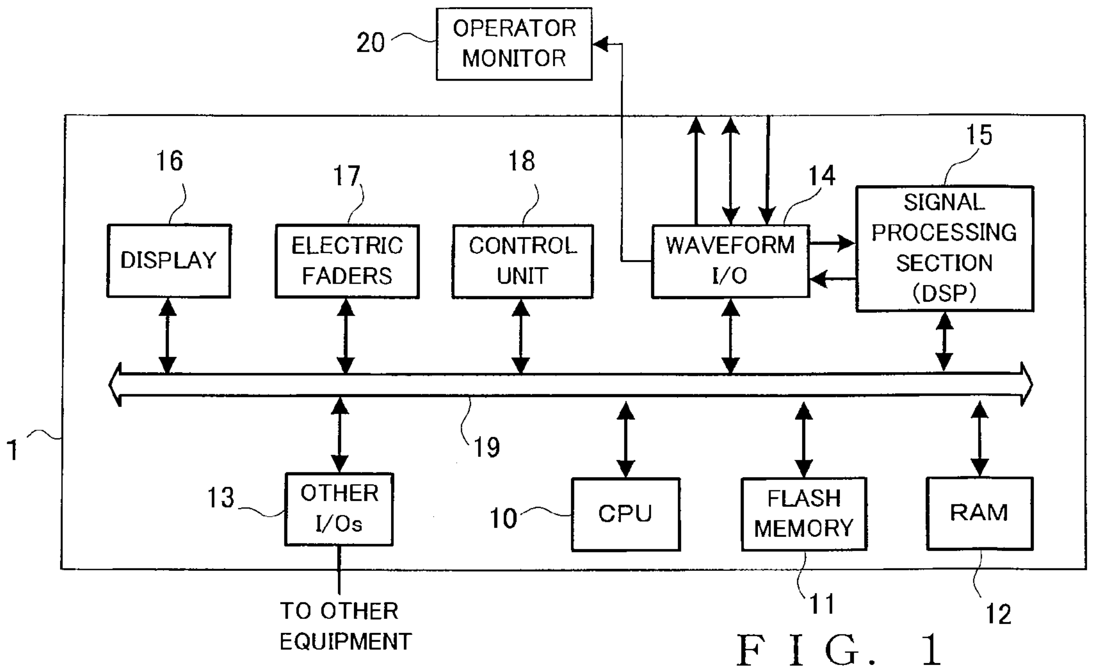
FIG. 1 is a block diagram showing an example general setup of a digital mixer that is an embodiment of a digital audio mixer of the present invention.

FIG. 1 is a block diagram showing an example general setup of the digital mixer of the present invention. The digital mixer 1 includes a CPU (Central Processing Unit) 10 that controls general behavior of the mixer 1 and generates control signals in response to operation of a mixing control, a rewritable, non-volatile flash memory 11 having stored therein operational software, such as mixing control programs for execution by the CPU 10, and a RAM (Random Access Memory) 12 functioning as a working area for use by the CPU 10 and storing therein various data etc. The flash memory 11 includes a current memory storing therein all control data (values of parameters). Further, other peripheral devices, such as a digital recorder, are connectable to the mixer 1 via other I/Os 13 that are input/output interfaces. These components shown in FIG. 1 are interconnected via a bus 19.

All input and output to and from the digital mixer 1 is performed via a waveform I/O (waveform data interface) 14. The waveform I/O 14 includes a plurality of analog input ports each including an A/D converter for converting an analog signal, input from outside the mixer, into a digital signal, a plurality of digital input ports for inputting digital signals, a plurality of analog output ports each including a D/A converter for converting a digital signal into an analog output signal, and a plurality of digital output ports for outputting digital signals.

The waveform I/O 14 also includes a monitor output port, whose output signal is supplied to an operator monitor 20. Thus, a human operator in an operator room can test-listen to the output signal of the operator monitor 20 without changing or influencing main output signals of the mixer 1.

A signal processing section (DSP (Digital Signal Processing) section) 15 performs mixing processing, effect processing, etc. on an audio signal, input via the waveform I/O 14, by executing microprograms on the basis of stored content of the current memory under control of the CPU 10, and it outputs the thus-processed audio signal or processed result via the waveform I/O 14. The DSP section 15 may include only one DSP (Digital Signal Processor), or a plurality of DSPs interconnected via a bus so that the signal processing can be performed distributedly by the plurality of DSPs.

A display device 16, electric fader group 17 and control unit 18 are user interfaces provided on an operation panel of the mixer 1. The display device 16 is in the form of a liquid crystal display for displaying various setting screens. The electric fader group 17 and control unit 18 comprise groups of controls provided on the operation panel. More specifically, the electric fader group 17 comprises fader-type controls, each with a knob-driving motor incorporated therein, which are manually operable by the human operator and whose operating positions can be automatically controlled on the basis of drive control signals given from the CPU 10. In response to operation of any of the control unit 18, group of electric faders 17 and display device 16, the CPU 10 adjusts values of parameters. In this specification, "adjusting (changing) a value of a parameter" means changing a value of a corresponding one of parameters, stored in the current memory, to a value corresponding to the operation and then reflecting the changed value in the DSP section 15 and display device 16.

Figure 2:
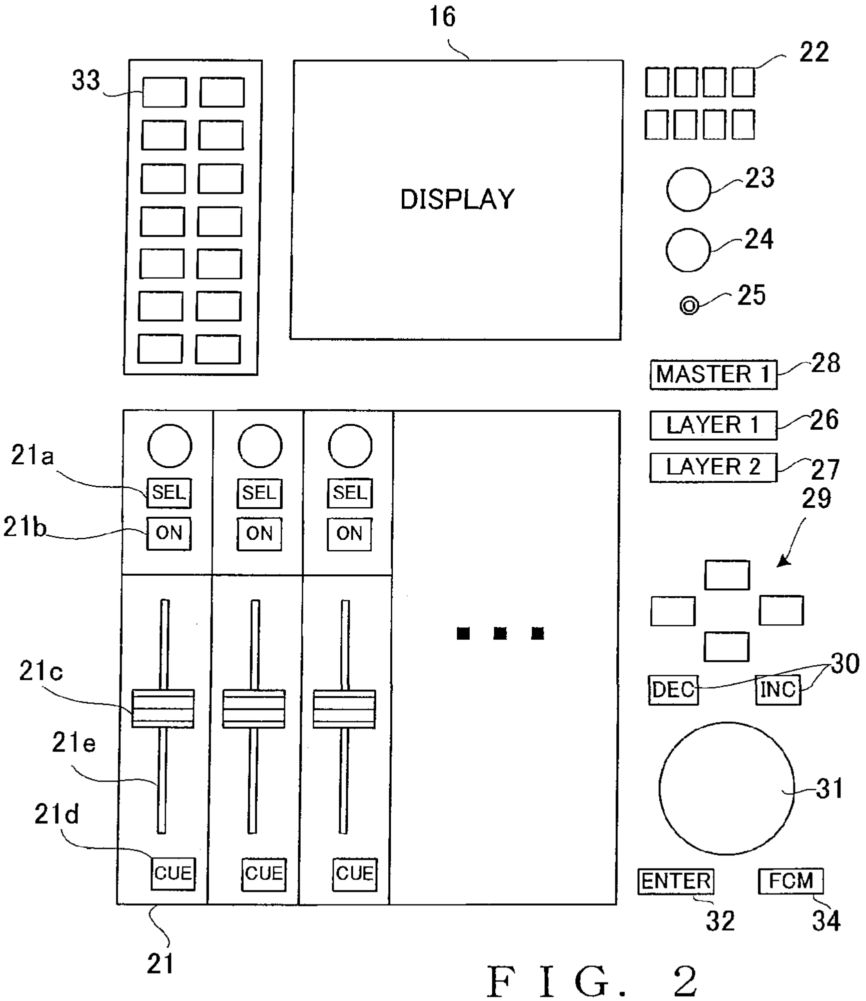
FIG. 2 is a diagram schematically showing an outer appearance of an operation panel of the digital mixer shown in FIG. 1.

FIG. 2 schematically shows an outer appearance of the operation panel of the digital mixer 1 shown in FIG. 1. Channel strips 21 of 12 (twelve) channels axe provided beneath the display device 16. The channel strips 21 for the twelve channels have their respective unique channel strip numbers i (i=i–12). Each of the channel strips 21 includes: a selection (SEL) switch 21*a* for selecting a channel allocated to the channel strip 21; a channel switch 21*b* for switching between ON and OFF states of the allocated channel; an electric fader 17 (fader knob 21*c*) for controlling a signal level of the allocated channel; and a CUE switch (test-listening switch) 21*d* for switching between CUE-ON and CUE-OFF states of the channel.

The fader knob 21*c* of each of the channel strips 21 is slidingly operable one dimensionally from a first end to a second end and drivable on the basis of a drive signal. Here, the first end is one end (upper end in the figure) of a movable range 21*e* while the second end is the other end (lower end in the figure) of the movable range 21*e*, and thus, operation for moving the knob 21*a* toward the upper end will hereinafter be referred to as "upward operation" while operation for moving the knob 21*a* toward the lower end will hereinafter be referred to as "downward operation".

By driving the knob 21*c* on the basis of a drive signal, the embodiment can automatically move the position of the knob 21*c* or generate resistance force against downward operation of the knob 21*c*.

Layer selection switches 26 to 28 are allocated various layers each comprising a set of 12 (twelve) channels, and any one of the layer selection switches 26 to 28 can be turned on, at a given time, to select one layer to be subjected to control via the 12 channel strips 21. The layers (layer 1, layer 2 and mater 1) are allocated their respective unique layer numbers LN (LN=1-3), and a currently selected layer number is stored into a register.

In response to operation of the "master 1" switch 26, output channels of channel numbers "1"-"12" are allocated to the channel strips 21, one output channel per channel strip 21. Further, in response to operation of the "layer 1" switch 27, input channels of channel numbers "1"-"12" are allocated to the channel strips 21, one input channel per channel strip 21. Further, in response to operation of the "layer 2" switch 28, input channels of channel numbers "13"-"24" are allocated to the channel strips 21, one input channel per channel strip 21.

Further, eight monitoring selector switches 22 are provided on the operation panel for causing various screens (such as a mixing setting screen and a menu screen to be displayed on the display device 16) in response to operation of the corresponding switches 22. A monitor and CUE delay adjustment knob 23 is a delay adjusting control for absorbing a time difference between a CUE signal and a monitoring signal being test-listened to by the human operator. A headphone can be connected to a headphone terminal 25, so that the human operator can listen to an audio signal output from the headphone terminal 25. A headphone volume knob 24 is operable to adjust a sound volume level of the audio signal output from the headphone terminal 25.

Furthermore, cursor moving keys 29 are provided on the operation panel for moving a cursor, displayed on the display device 16, in up-down and left-right directions. Increment and decrement keys 30 are operable to increase and decrease a value or the like selected via the cursor on the display device 16. A jog dial 31, which is a rotary-type selector, selects a setting (value) of any one of various parameters, numerical values, etc. selected or marked by the cursor on the display device 16. An enter key 32 is operable to confirm a setting selected by the increment or decrement key 30 or the jog dial 31. Note that all of various controls other than the fader knobs 21*c* of the channel strips 21 correspond to controls of the control unit 18 of FIG. 1.

Furthermore, 12 (twelve) send switches 33 are allocated buses, one bus per send switch 33. For one channel selected by the selection (SEL) switch 21*a*, the send switches 33 set settings of send ON/OFF parameters of a signal, which are to be sent from the selected channel to a plurality of buses, on a bus-by-bus basis.

Note that the mixer 1 is equipped with a so-called "scene function". Once the human operator gives a scene store instruction designating a scene number, the scene function can record a set of data of one scene (i.e., one scene data set), comprising settings of parameters for controlling current behavior of the mixer (i.e., all settings stored in the current memory), into a scene memory provided in the flash memory 11. Also, once the human operator gives a scene recall instruction designating a scene number, the scene function can overwrite settings of parameters, corresponding to one scene data set recorded in the memory 11, into the current memory, to thereby reproduce the parameter settings.

The reason why each of the fader controls (knobs 21*c*) is in the form of the electric fader 17 in the instant embodiment is that the primary use of the fader control is to move, at the time of scene recall, the fader knob 21*c* to a position corresponding to a scene-recalled level parameter.

<Fader Cue Mode>

In the mixer 1, the human operator can set any one of a normal mode (i.e., first mode) and a fader CUE mode (i.e., second mode) as a use mode of the fader knob 21*c* (electric fader 17). In the normal mode, a sound volume level of a channel is controlled in response to a position of the fader knob 21*c* of the channel in the entire movable range 21*e*, from the lower end to the upper end, of the fader knob 21*c*, as in the conventionally-known technique. In the fader CUE mode, on the other hand, switching can be made between the CUE-ON and CUE-OFF states of the channel by use of the fader knob 21*c*, as will be described later.

Setting of the fader use mode can be performed, for example, via a fader CUE mode switch 34 or via a mode setting screen called out to the display device 16. Once the human operator performs operation for setting the normal mode or the fader CUE mode, the CPU 10 sets a value of the fader CUE mode in accordance with the operation performed by the human operator. When the value of the fader CUE mode is "0", it means that the fader CUE mode is OFF, while, when the value of the fader CUE mode is "1", it means that the fader CUE mode is ON, i.e. that the fader use mode is the "fader CUE mode".

<Signal Processing Construction>

Figure 3:
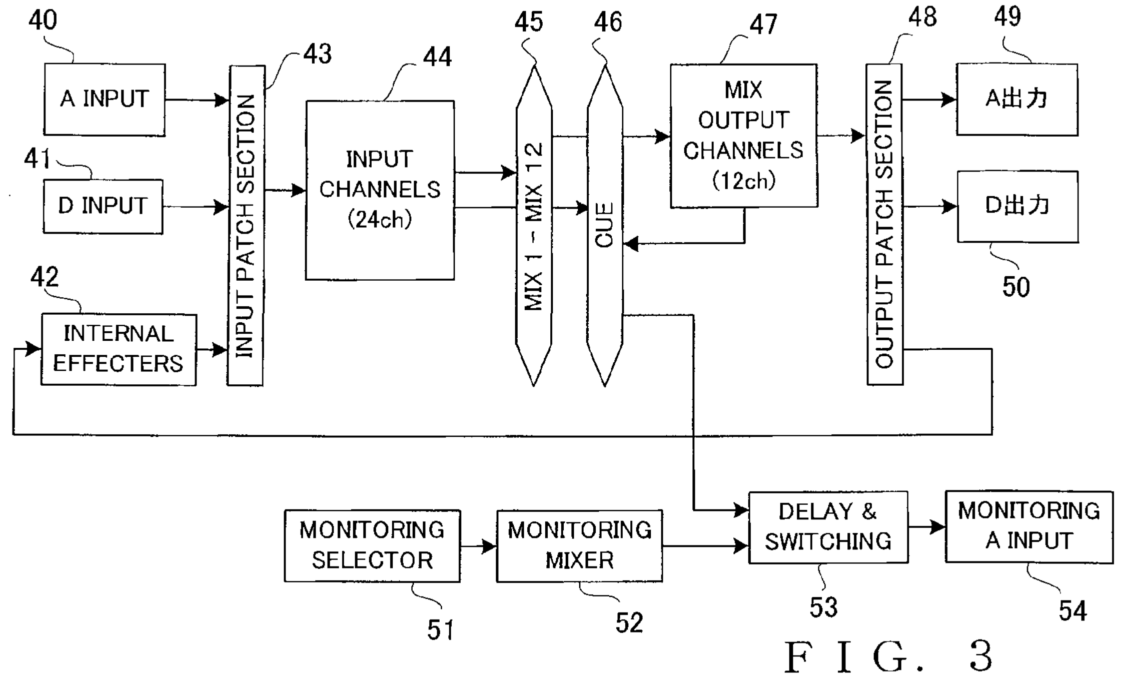
FIG. 3 is a block diagram showing a signal processing construction employed in the digital mixer shown in FIG. 1.

FIG. 3 is an equivalent block diagram showing a construction for signal processing performed by the waveform I/O 14 and DSP section 15. In FIG. 3, an analog input section ("A input") 40 and digital input section ("D input") 41 correspond to audio signal input functions (mainly, functions of A/D conversion, format conversion and the plurality of input ports) of the waveform I/O 13.

An input patch section 43 supplies an audio signal, input from each of the input ports, to one or more input channels connected with the input port, in accordance with connections between the input ports and the input channels indicated by input patch setting data. Patch setting is performed on the input patch section 43 by the CPU 10 setting patch setting data of the current memory in response to patch-setting-data setting operation by the human operator.

As further shown in FIG. 3, an input channel section 44 comprises 24 (twenty-four) input channels. Each of the input channels of the input channel section 44 performs various signal processing, such as sound characteristic adjustment and level control by the sound volume fader, on an audio signal input from the input port, allocated to the input channel by the input patch section 43, on the basis of values of corresponding parameters stored in the current memory. The audio signal having been subjected to such signal processing is output to one or more buses of the MIX bus section 45 provided at a succeeding stage in accordance with bus send ON/OFF parameter settings. Namely, each of the input channel 44 controls the level of the supplied signal on the basis of the level parameter and then outputs the thus-level-controlled audio signal. Further, the audio signal each of the input channels 44 is supplied to a CUE bus 46 when the CUE-ON/OFF parameter of the channel is "ON".

Each of the 12 (twelve) MIX buses 45 mixes one or more digital audio signals selectively input from one or more of the 24 input channels and outputs a resultant mixed signal (mixed output) to an output channel of a MIX output channel section 47 which corresponds to the bus. In this way, there can be obtained mixed outputs of 12 channels having been mixed in up to 12 different ways. In many cases, such output signals from the MIX buses 45 are supplied to speakers and the like as main output signals via A and D output sections 49 and 50 of the mixer 1.

The MIX output channel section 47 includes 12 (twelve) output channels provided in corresponding relation to the 12 MIX buses 45. Each of the output channels 47 performs various signal processing, such as sound characteristic adjustment and level control by the sound volume fader, on the output signal (mixed output) from the corresponding bus 45 on the basis of values of corresponding parameters stored in the current memory, and then it outputs the thus-processed audio signal to an output patch section 48. Namely, each of the output channels 47 controls the level of a supplied audio signal on the basis of a level parameter and outputs the thus-level-controlled audio signal. Further, the audio signal each of the output channels 47 is supplied to the CUE bus 46 when the CUE-ON/OFF parameter of the channel is ON.

The output patch section 48 supplies the audio signal, input from each of the output channels, to one or more output ports connected therewith in accordance with connections between the output channels and the output ports indicated by output patch setting data. Patch setting is performed on the output patch section 48 by the CPU 10 setting patch setting data of the current memory in response to patch-setting-data setting operation by the human operator.

The output signal of each of the output channels is output via one or more of the output ports (A output section 49 and D output section 50) which are connected with the output channel via the output patch section 48, as main output signals. The A and B (main) output sections 49 and 50 output, to the outside the audio signals, output signals from the output channels 47 (i.e., audio signals output from the MIX buses 45). The A output section 49 and D output section 50 correspond to the audio signal input functions (mainly, functions of D/A conversion, format conversion and the plurality of output ports) of the waveform I/O 13.

Further, the output patch section 48 can allocate the individual output channels of the output channel section 47 to an internal effecter section 42. The internal effecter section 42 comprises eight effecters for imparting effects, such as reverberation, echo and chorus. Thus, the human operator can impart desired effects to the output signals of the individual output channels via the internal effecter section 42. Effect imparting processing by the internal effecter section 42 is implemented by the signal processing of the signal processing section 15. Outputs of the internal effecter section 42 (i.e., effect-imparted signals) are supplied to the input patch section 43, via which they can be allocated to the input channels in accordance with the patch settings.

To the CUE bus 46 is supplied an audio signal of any of the channels, which is currently set in a CUE-ON state, of the input channel section 44 and MIX output channel section 47. The CUE bus 46 outputs the audio signal, supplied from the channel set in the CUE-ON state, to a delay and switching section 53 as a CUE signal. In a case where audio signals of a plurality of the channels are supplied to the CUE bus 46, the CUE bus 46 mixes the audio signals of the plurality of the channels and outputs a resultant mixed signal to the delay and switching section 53 as a CUE signal. In addition to such a CUE signal, signals of one or more channels selected by a monitoring selector 51 are supplied, via a monitoring mixer section 52, to the delay and switching section 53 as a monitoring signal.

The delay and switching section 53 switchably selects one of the monitoring signals input from the monitoring mixer section 52 and the CUE signal input from the CUE bus 46, and it outputs the selected signal to a monitoring analog output section 54 provided at a succeeding stage. Namely, when there is no CUE signal input to the delay and switching section 53, the delay and switching section 53 outputs the monitoring signal to the monitoring analog output section 54. When any of the channels is set in the CUE-ON state and thus a CUE signal is input to the delay and switching section 53 from the CUE bus 46, the delay and switching section 53 turns off or attenuates the monitoring signal input from the monitoring mixer section 52 and outputs only the CUE signal to the monitoring analog output section 54. Also, the delay and switching section 53 delays its own output signal (monitoring signal or CUE signal) to thereby correct a time difference between the output signal (monitoring signal or CUE signal) and the main output signal of any of the A output section 49 and D output section 50. The thus-corrected output signal is output via the operator monitor 20.

The monitoring analog output section 54 is, for example, in the form of the headphone terminal 25, which outputs the output signal (i.e., monitoring signal or CUE signal) of the delay and switching section 53. Namely, the monitoring analog output section 54 outputs an audio signal designated as a CUE signal (or a test-listening signal). The audio signal output from the monitoring analog output section 54 can be output as a CUE signal (or a test-listening signal) of a different route from the main output signals 49 and 50 without influencing the mixing processing performed on the main output signals.

Figure 4:
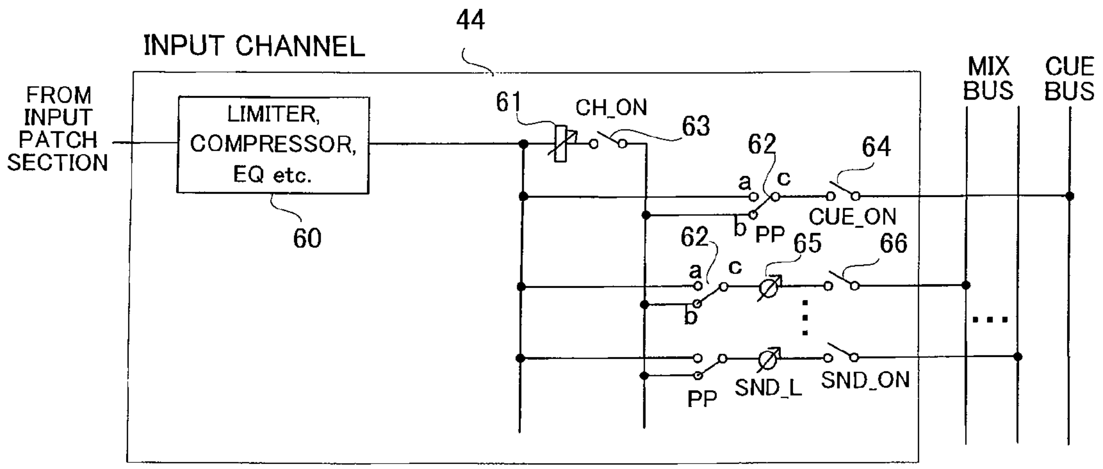
FIG. 4 is a diagram showing an example construction of one of input channels of an input channel section employed in the digital mixer shown in FIG. 1.

FIG. 4 shows an example construction of one of the input channels 44 that are constructed similarly to one another. An audio signal input from the input patch section 43 to the input channel 44 is adjusted in level and frequency characteristic via a characteristic processing section 60 including a limiter, compressor, equalizer (EQ), etc. and then supplied to a sound volume fader 61 (electric fader 17 of FIG. 1). Also, the input signal before being passed to the sound volume fader 61 and input channel switch 63, i.e. a pre-fader signal, is supplied not only to an "a" contact of a pre/post switching switch ("PP") 62 associated with the CUE bus but also to an "a" contact of 12 (twelve) pre/post switching switches ("PP") 62 associated with the 12 (twelve) MIX buses.

Further, the input signal having been level-controlled by the sound volume fader 61 is supplied, via the input channel switch ("CH-ON") 63, not only to a "b" contact of the pre/post switching switch 62 associated with the CUE bus but also to a "b" contact of the 12 pre/post switching switches 62 associated with the 12 (twelve) MIX buses. The input channel switch ("CH-ON") 63 corresponds to the channel switch 21*b* of FIG. 2 and passes the signal (channel-ON) or shuts off the signal (channel-OFF) in accordance with a channel-ON/OFF parameter of the input channel in question.

An output signal of a movable "c" contact of the pre/post switching switch 62 associated with the CUE bus is supplied to the CUE bus 46 via a CUE switch ("CUE_ON") 64. The CUE switch 64 corresponds to the CUE switch 21*d* of FIG. 2 and passes the signal (CUE-ON) or shuts off (CUE-OFF) the signal in accordance with a CUE parameter of the input channel in question.

Further, output signals from movable "c" contacts of the 12 pre/post switching switches 62 associated with the MIX buses are supplied to the corresponding MIX buses 45 via send level (SND_L) portions 65 and send switches (SND_ON) 66. The send level portions 65 control a send gain of the signal to be supplied from the input channel to the MIX buses 45 on a MIX-bus-by-MIX-bus basis (i.e., individually for each of the MIX buses 45) in accordance with send level parameters set in the input channel for the individual MIX buses 45. The send switches 66, which correspond to the send switches 33 of FIG. 2, pass the signal from the input channel to the corresponding MIX buses 45 (send-ON) or shut off the signal (send-OFF) in accordance with send ON/OFF parameters set in the input channel for the individual MIX buses 45.

Each of the pre/post switching switches 62 switches between the "a" and "b" contacts in accordance with a pre/post parameter (Pre/Post) of the input channel in question. The pre-fader signal is a signal present at a stage preceding the sound volume fader 61 and input channel switch 63, while the post-fader signal is a signal present at a stage succeeding the sound volume fader 61 and input channel switch 63.

When the CUE switch 64 of the input channel 44 is ON, a pre-fader signal or post-fader signal is supplied to the CUE bus 46 in accordance with a setting of the pre/post switching switch 62.

When the send switch 66 of the input channel 44 is ON, a pre-fader signal or post-fader signal is supplied, via the send level portion 65, to the MIX bus corresponding to the send switch 66 in accordance with a setting of the pre/post switching switch 62 corresponding to the send switch 66.

<Output Channel>

Figure 5:
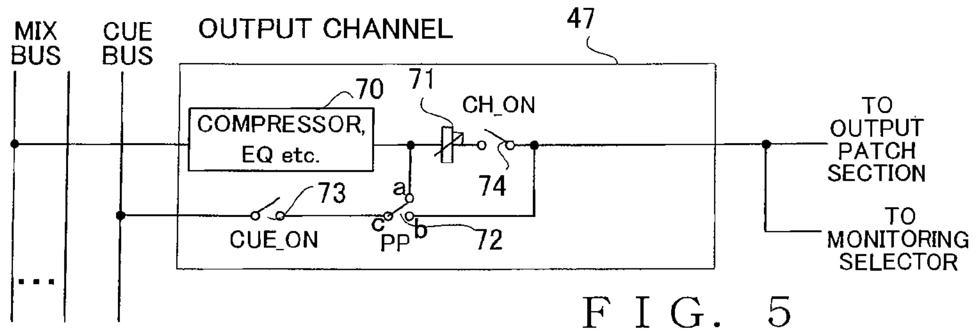
FIG. 5 is a diagram showing an example construction of one of output channels of an output channel section employed in the digital mixer shown in FIG. 1.

FIG. 5 shows an example construction of one of the output channels 47 that are constructed similarly to one another. In the output channel 47, a signal output from any one of the 12 MIX buses 45 is adjusted in level and frequency characteristic via a processing section 70 including a compressor, equalizer (EQ), etc. The signal output from the processing section 70 is supplied not only to a sound volume fader 71 (electric fader 17 of FIG. 1) but also to an "a" contact of a cueing pre/post switching switch (PP) 72. The signal level-controlled by the sound volume fader 71 of the output channel is output, via an output channel switch (CH_ON) 74, to the output patch section 48 or monitoring selector 51.

The signal level-controlled by the sound volume fader 71 of the output channel is also output, via the output channel switch (CH_ON) 74, to a "b" contact of the pre/post switching switch 72. The signal output from a movable "c" contact of the cueing pre/post switching switch 72 is supplied to the CUE bus 46 via a CUE switch (CH_ON) 73. The CUE switch 73, which corresponds to the CUE switch 21*d* of FIG. 2, passes the signal (CUE-ON) or shuts off the signal (CUE-OFF) in accordance with a CUE parameter of the output channel.

The pre/post switching switch 72 switches between the "a" and "b" contacts in accordance with a pre/post parameter (Pre/Post) of the output channel in question. When the CUE switch 73 of the output channel 47 is ON, a pre-fader signal or post-fader signal is supplied to the CUE bus 46 in accordance with a setting of the pre/post switching switch 72.

<CUE Parameter ON/OFF>

In the mixer 1, two modes, i.e. normal mode and fader CUE mode, are available as the fader use mode. When the fader CUE mode is set, the human operator can set a CUE parameter for each of the input and output channels using the electric fader 17 (fader knob 21c) of the corresponding channel strip 21. The human operator can also set a CUE parameter for each of the input and output channels using the CUE switch (test-listening switch) 21d, as in the conventionally-known technique.

<CUE-ON/OFF Using CUE Switch>

Figure 6:
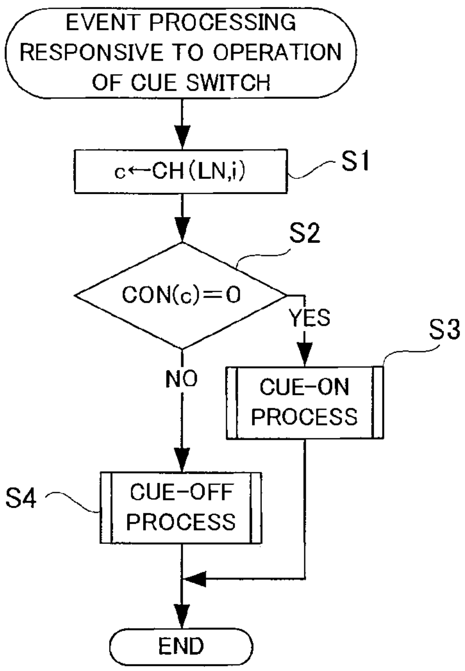
FIG. 6 is a flow chart of an example of event processing performed in response to operation of a CUE switch.

FIG. 6 is a flow chart of an example of event processing performed by the CPU 10 once the human operator operates the CUE switch 21d provided in one of the 12 channel strips 21. Upon start of the event processing responsive to detection of such operation, the CPU 10 stores the channel strip number i (i=1-12) of the operated CUE switch 21d into a register.

At step S1, the CPU 10 sets information CH(LN, i), identifying the channel corresponding to the operated CUE switch 21d, to an object-of-CUE channel parameter c. A value c (c=1-36) identifying one of the 24 input channels and 12 output channels can be obtained on the basis of a combination of the layer number LN (LN=1-3) and channel strip number i (i=1-12). For example, c=1-24 represent the 24 input channels, and c=25-36 represent the 12 output channels. Thus, a channel (c) that becomes an object of CUE in response to the current operation (i.e., object-of-CUE channel) can be identified on the basis of a combination of the layer number LN and channel strip number i.

At step S2, the CPU 10 checks a current value of the CUE parameter CON(c) of the object-of-CUE channel (c). CON (c)=1 indicates a CUE-ON state (i.e., signal-passing state of the CUE switch 64 or 73) of the channel (c) in question, while CON(c)=0 indicates the CUE-OFF state (i.e., signal-shutting-off state of the CUE switch 64 or 73) of the channel (c) in question. If CON(c)=0, i.e. if the channel (c) in question is currently in the CUE-OFF state, (YES determination at step S2), the CPU 10 goes to step S3 to perform a CUE-ON process subroutine for setting the channel (c) in the CUE-ON state. If, on the other hand, CON(c)=1, i.e. if the channel (c) in question is currently in the CUE-ON state, (NO determination at step S2), the CPU 10 proceeds to step S4 to perform a subroutine for setting the channel (c) in the CUE-OFF state. Namely, the CUE switch 21d toggles between the ON and OFF states each time it is operated.

Namely, by performing the operations of steps S2 to S4 in response to operation of the CUE (test-listening) switch 21d, the CPU 10 functions as a third control means which designates an audio signal of the channel, allocated to the switch 21d, as a CUE signal (test-listening signal) if the signal of the channel is not currently designated as a CUE signal (test-listening signal), and which cancels designation, as a CUE signal (test-listening signal), of the signal of the channel if the signal of the channel is currently designated as a CUE signal (test-listening signal).

<CUE-ON/OFF by Fader Operation>

Figure 7:
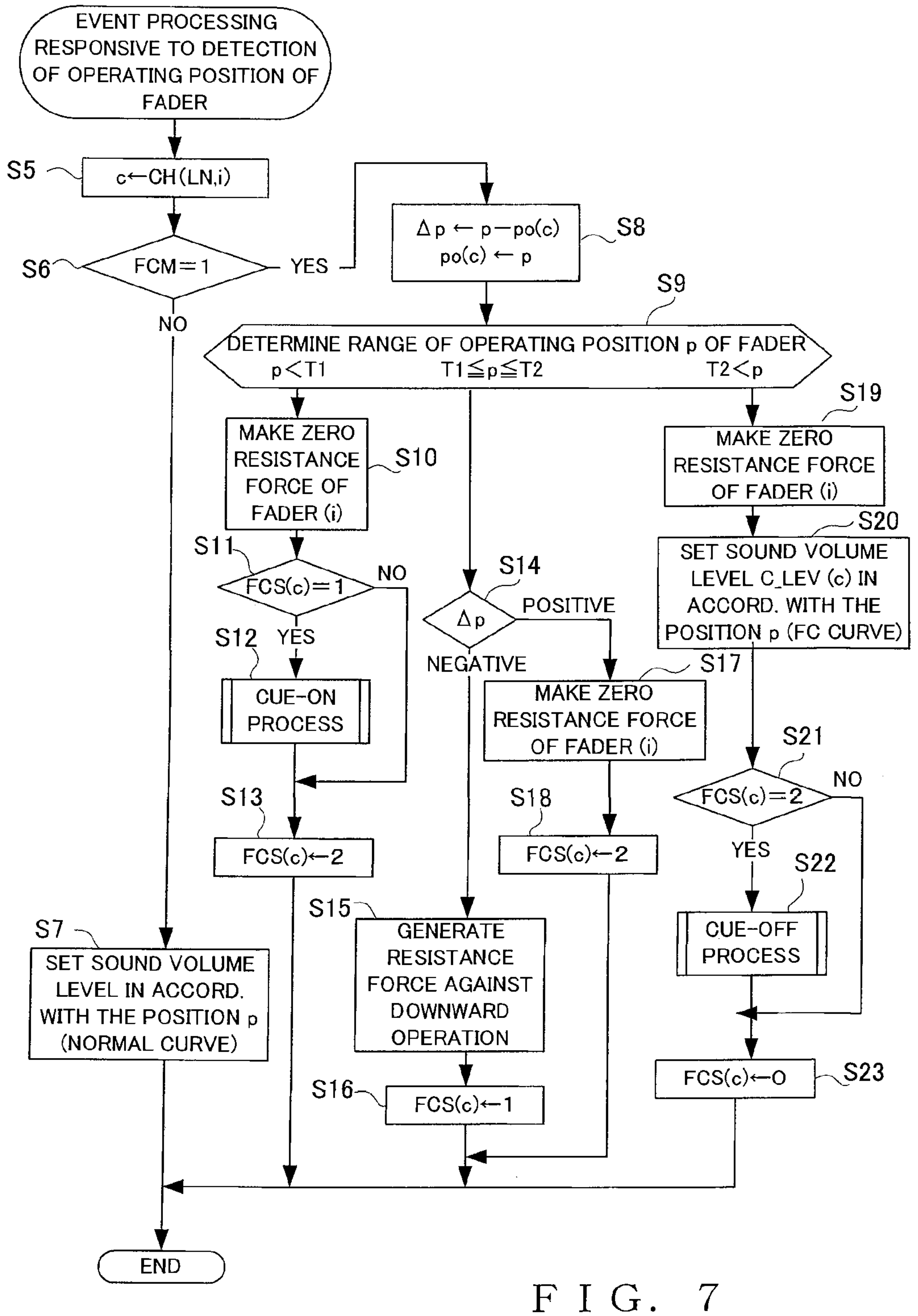
FIG. 7 is a flow chart of an example of event processing performed in response to operation of a fader control.

Once the human operator operates the fader knob 21c (electric fader 17) provided in any one of the 12 channel strips 21, the CPU 10 detects a change in position p of the fader knob 21c caused by the human operator's operation. FIG. 7 is a flow chart of an example of event processing performed by the CPU 10 upon detection of a change in operating position p of the fader knob 21c. Upon start of the event processing responsive to detection of a change in position p of the fader knob 21c, the CPU 10 stores the channel strip number i (i=1-12) of the fader knob 21c into the register.

At step S5, the CPU 10 sets information CH(LN, i), identifying the channel corresponding to the operated CUE switch 21d, to the object-of-CUE channel parameter c. At step S6, the CPU 10 determines in which one of the "normal mode" and "fader CUE mode" the fader use mode is currently set.

If the fader use mode is currently set in the "normal mode" (FCM=0) (NO determination at step S6), the CPU 10 goes to step S7 to set a sound volume level C_LEV(c), corresponding to the position p, of the channel in question on the basis of a level setting table for the "normal mode" (i.e., normal curve) as in the conventionally-known technique, after which the current event processing is brought to an end. The level setting table for the normal mode (normal curve) is a table defining sound volume adjusting values corresponding to individual knob positions in the entire movable range (from the lower end to the upper end) of the fader knob 21c. Namely, in the normal curve, where a zero level (−∞dB) is allocated to the lower end position of the fader knob 21c, the defined sound volume adjusting value gradually increases as the position p of the fader knob 21c approaches the upper end position, so that a maximum sound volume adjusting value is output from the table when the fader knob 21c is at the upper end position.

Namely, if the fader use mode is currently set in the "normal mode" (first mode), the CPU 10 performs, at step S7, control for progressively changing the value of the level parameter of the channel (c) corresponding to or allocated to the operated fader knob 21c in accordance with the operating position p in such a manner that the level parameter increases in value as the operating position p approaches the upper end (first end) of the fader's movable range and decreases in value as the operating position p approaches the lower end (second end) of the fader's movable range.

If the fader use mode is currently set in the "fader CUE mode" (FCM=1) (YES determination at step S6), on the other hand, the CPU 10 goes to step S8, where it sets, as a positional change Δp, a positional change amount corresponding to the current operation on the basis of the current position p of the fader knob 21c detected in response to the current operation and a last position po(c) of the knob 21c of the channel in question and then overwrites the last position po(c) with the current position p.

Figure 8:
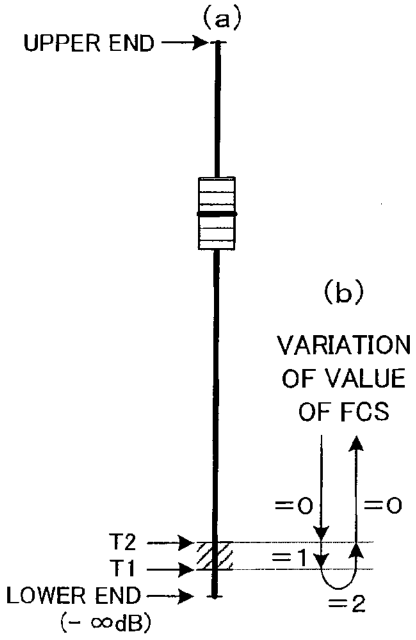
FIG. 8 is a diagram explanatory of an example manner in which first and second predetermined positions are set with respect to a fader's movable range, as well as relationship between a positional change of a fader knob and variation in value of a fader CUE state.

At step S9, the CPU 10 further determines whether the current operating position p detected in response to the current operation of the fader knob 21c is lower than a first predetermined position T1, higher than a second predetermined position T2 or within a range from the first predetermined position T1 to the second predetermined position T2. In FIG. 8, (a) shows example settings of the first and second predetermined positions T1 and T2. The first predetermined position T1 is a predetermined position near the lower end (that is, in the normal mode, a position corresponding to minus infinity) of the movable range, and the first predetermined position T1 is set lower than the second predetermined position T2. The first predetermined position T1 is a CUE-ON setting reference position. The second predetermined position T2 is a predetermined position a little higher than the first predetermined position T1, and it is a lower end position of a sound volume level control range in the fader CUE mode. Further, the second predetermined position T2 is a CUE-OFF setting reference position. The range from the first predetermined position T1 to the second predetermined position T2 becomes a resistance force generating range (hatched range in (a) of FIG. 8) where resistance force against the fader knob is generated as will be described.

At following steps S10 to S23, the CPU 10 performs control for setting ON/OFF of the CUE parameter and for switching between ON and OFF states of resistance force to be given to the fader knob 21c, on the basis of the current position p determined at step S9 above and channel-specific values of the fader CUE state FCS(c). When the value of the fader CUE state FCS(c) is "0", it indicates that the CUE parameter of the channel (c) is OFF; when the value of the fader CUE state FCS(c) is "2", it indicates that the CUE parameter of the channel (c) is ON; and when the value of the fader CUE state FCS(c) is "1", it indicates that resistance force is being generated against the fader knob of the channel (c).

In FIG. 8, (b) indicates variation of the value of the fader CUE state FCS corresponding to the knob position p and direction of positional change of the position p. If the knob position p is higher than the second predetermined position T2, the FSC is "0". Further, if the knob position p is within the range from the first predetermined position T1 to the second predetermined position T2 and the positional change direction (knob operating direction) is downward, the FSC(c) is "1". Further, if the knob position p is within the range from the first predetermined position T1 to the second predetermined position T2 and if the positional change direction (knob operating direction) is upward, the FSC(c) is "2". Namely, as the fader knob is operated downward, the FSC varies from "0" to "1" with the second predetermined position T2 as a boundary point and varies from "1" to "2" with the first predetermined position T1 as a boundary point. But, as the fader knob is operated upward, the FSC remains at "2" as long as the position p is within the range equal to or lower than the second predetermined position T2 and varies from "2" to "0" with the second predetermined position T2 as a boundary point.

If the current position p is lower than the first predetermined position T1 ("p<T1" at step S9), the CPU 10 goes to step S10 to make zero resistance force against the fader knob 21*c* of the channel strip (i). At next step S11, the CPU 10 determines whether the current value of the FSC(c) is "1". If the current value of the FSC(c) is "1" (YES determination at step S11), the CPU 10 performs, at step S12, a CUE-ON process subroutine for setting the channel (c) in question in the CUE-ON state. The CPU 10 sets the FCS(c) at "2" at step S13, after which the current event processing is brought to an end.

If the current value of the FCS(c) is other than "1" (NO determination at step S11), the CPU 10 sets the FCS(c) at "2" at step S13 without performing the CUE-ON setting subroutine, after which the current event processing is brought to an end. Because the CPU 10 performs the CUE-ON process subroutine of step S12 only when the current value of the FCS(c) is "1" as determined at step S11, the channel (c) is set in the CUE-ON setting only when the fader knob 21*c* has been operated against resistance force being generated. Namely, by the CPU 10 performing the CUE-ON setting subroutine of step S12 when the fader knob 21*c* has been operated downward beyond the predetermined range (equal to or lower than the second predetermined position T2 but equal to or higher than the first predetermined position T1), it functions as a first control means that designates, as a CUE signal (test-listening signal), an audio signal of the channel (ch) allocated to the fader knob 21*c*.

If the current position p is equal to or higher than the first predetermined position T1 but equal to or lower than the second predetermined position T2 ("T1>p≤T2"), the CPU 10 goes to step S14 to determine whether the current positional change amount Δp is of a positive value or a negative value, to thereby determine whether the current operating direction of the fader knob 21*c* is upward or downward.

If the operating direction of the fader knob 21*c* is downward (Δp=negative value) ("Negative" at step S14), the CPU 10 goes to step S15, where it drives the fader knob 21*c* of the channel strip (i) by outputting a predetermined drive control signal to the fader knob 21*c* to thereby generate resistance force against the downward operation of the fader knob 21*c*. The resistance force is force acting in an upward direction opposite to the downward movement of the fader knob 21*c*; for example, the resistance force is set to such a degree of force as to appropriately resist the downward operation while simultaneously preventing automatic upward movement of the fader knob 21*c*. As the fader knob 21*c* is operated downward (toward the lower or second end) in the predetermined range (equal to or higher than the first predetermined position T1 but equal to or lower than the second predetermined position T2) provided near the lower or second end, the CPU 10 functions as a resistance force generation means for generating resistance force against the downward operation of the fader knob 21*c* by driving the fader control by a drive signal, at step S15. By generating such resistance force at step S15, it is possible to allow the human operator to recognize the lower end position (i.e., second predetermined position T2) of the sound volume level control range in the fader CUE mode. The CPU 10 sets the FCS(c) at "1" at next step S16, after which the current event processing is brought to an end.

If, on the other hand, the operating direction of the fader knob 21*c* is upward (Δp=positive value) ("Positive" at step S14), the CPU 10 goes to step S17 to make zero the resistance force against the fader knob 21*c* of the channel strip (i) and then proceeds to step S18 to set the FCS(c) at "2", after which the current event processing is brought to an end.

If the current position p is higher than the second predetermined position T2 ("T2<p" at step S9), the CPU 10 goes to step S19 to make zero the resistance force against the fader knob 21*c* of the channel strip (i) and then proceeds to step S20 to set a sound volume level C_LEV(c) of the channel (c) in accordance with the operating position p on the basis of the level setting table for the "fader CUE mode" (i.e., FC curve).

The FC curve is a data table defining sound volume adjusting values corresponding to individual knob positions from the second predetermined position T2 to the upper end. Namely, in the FC curve, where a zero level (−∞dB) is allocated to the second predetermined position T2, the sound volume adjusting value defined gradually increases as the position p of the fader knob 21*c* approaches the upper end, so that a maximum sound volume adjusting value is output from the table when the fader knob 21*c* is at the upper end. Thus, the human operator can control the sound volume level of the channel (c) in accordance with the current operating position of the fader knob 21*c* from the second predetermined position T2 to the upper end.

Therefore, if the fader use mode is currently set in the "fader CUE mode" (second mode), when the position p of the fader knob 21*c* is in the sound volume level control range higher than the second predetermined position T2, the CPU 10 progressively changes the value of the level parameter of the channel (c), allocated to the knob 21*c*, so that the level parameter increases in value as the position p approaches the upper end (first end) and decreases in value as the position p approaches the second predetermined position T2, at step S20. If, on the other hand, the position p of the fader knob 21*c* is within a range of equal to or lower than the second predetermined position T2 (from the position T2 to the lower end), the CPU 10 maintains the value of the level parameter at the zero level (−∞dB).

At next step S21, the CPU 10 further determines whether the current value of the FCS(c) is "2". If the current value of the FCS(c) is "2" (YES determination at step S21), the CPU 10 goes to step S22 to perform a CUE-OFF process subroutine for setting the channel (c) in question in the CUE-OFF state. The CPU 10 sets the FCS(c) at "0" at next step S23, after which the current event processing is brought to an end.

If the current value of the FCS(c) is other than "2", i.e. if the current value of the FCS(c) is "1" or "0" (NO determination at step S21), the CPU 10 sets the FCS(c) at "0" at step S23, after which the current event processing is brought to an end without performing the CUE-OFF process subroutine because the channel (c) is not currently in the CUE-ON state.

Namely, once the fader knob 21*c* is operated upward (toward the first end) beyond the predetermined range (equal to or lower than the second predetermined position T2 but equal to or higher than the first predetermined position T1), the CPU 10 functions as a second control means which, by performing the operation of step S22, cancels designation, as a CUE signal (test-listening signal), of the signal of the channel (c) allocated to the knob 21*c*.

The following summarize the CUE-ON/OFF switching and generation of resistance force responsive to operation of the fader knob 21*c*.

Once the fader knob 21*c* is operated in such a manner that the position p is lowered to or below the second predetermined position T2, resistance force against the movement or operation of the fader knob 21*c* is generated at step S15, which allows the human operator to recognize the lower end T2 of the sound volume level control range. Thus, if the human operator does not intend to set the channel (c) in the CUE-ON state, the human operator only has to stop the downward operation upon recognition of the lower end T2.

The human operator can set the channel (c) in the CUE-ON state, by applying downward force to the fader knob 21*c*, against which resistance force is being generated, to further lower the knob 21*c* beyond the first predetermined position T1. Because the instant embodiment is constructed to set the channel (c) in the CUE-ON state in response to the human operator further lowering the knob 21*c*, against which resistance force is being generated, against the resistance force, it can effectively prevent erroneous CUE-ON setting operation (i.e., CUE-ON setting operation unintended by the human operator). Further, because the resistance force is made zero once the position p is lowered beyond the first predetermined position T1 (step S10), the human operator can recognize, from variation (i.e., elimination) of the resistance force, that the knob position p has reached a CUE-ON setting range (i.e., below the first predetermined position T1)

After the channel (c) is set in the CUE-ON state by the operation of the fader knob 21*c* in the aforementioned manner, sound volume level control corresponding to the position p of the fader knob 21*c* can be performed for a signal of the channel (c) by the human operator operating the fader knob 21*c* in the upward direction to return the knob position p to above the second predetermined position T2 and thereby set the channel (c) back to the CUE-OFF state (step S22).

<CUE-ON Process>

Figure 9:
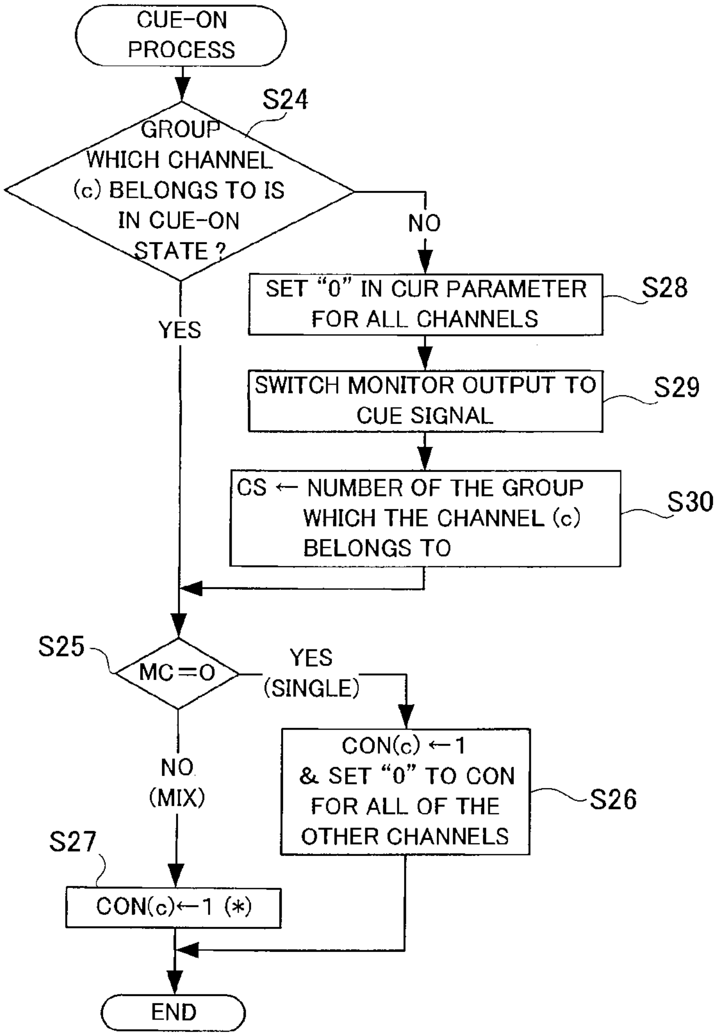
FIG. 9 is a flow chart explanatory of a CUE-ON process.

FIG. 9 is a flow chart explanatory of the CUE-ON process performed at step S3 and S12 above. At step S24, the CPU 10 checks the current CUE status CS to determine whether a group which the object-of-CUE channel (c) belongs to is currently in the CUE-ON state. The group is a group in a later-described CUE mode, and there are two types of groups: a group of input channels (i.e., a group in which input channels are registered); and a group of output channels (i.e., a group in which output channels are registered). When the value of the CUE status CS is "0", each of the groups is currently in the CUE-OFF state; when the value of the CUE status CS is "1", the group of input channels includes an input channel that is currently in the CUE-ON state; and when the value of the CUE status CS is "2", the group of output channels includes an output channel that is currently in the CUE-ON state.

If the group which the object-of-CUE channel (c) belongs to is currently in the CUE-ON state (YES determination at step S24), the CPU 10 proceeds to step S25 checks a CUE mode parameter MC. When the value of the CUE mode parameter MC is "1", the parameter MC indicates a "single CUE mode"; and when the value of the CUE mode parameter MC is "2", the parameter MC indicates a "mix CUE mode". In the "single CUE mode", only one channel corresponding to one CUE switch 21*d* operated by the human operator is exclusively set in the CUE-ON state in response to the operation of the CUE switch 21*d*. In the "mix CUE mode", on the other hand, a plurality of channels belong to a same group are simultaneously set in the CUE-ON state, so that signals of the plurality of channels are mixed together via the CUE bus 46 to be output a CUE signal.

If the CUE mode parameter MC indicates the "single CUE mode" (YES determination at step S25), the CPU 10 goes to step S26 to set a value "1", indicative of the CUE-ON state, to the CUE parameter CON(c) of the channel (c) in question, and sets the CUE parameter CON(c) at a value "0", indicative of the CUE-OFF state, for the all of the other channels. Thus, in the single CUE mode, only one channel corresponding to the operated CUE switch 21*d* is exclusively set in the CUE-ON state, while all of the other channels are set in the CUE-OFF state.

If the CUE mode parameter MC indicates the "mix CUE mode" (NO determination at step S25), the CPU 10 goes to step S27 to set the value "1", indicative of the CUE-ON state, to the CUE parameter CON(c) of the channel (c) in question. Because the operation of step S27 is performed if the group which the channel (c) in question belongs to includes a channel currently set in the CUE-ON state as determined at step S24 above, the channel corresponding to the currently operated CUE switch 21*d* is set in the CUE-ON state, in addition to the channel already set in the CUE-ON state, through operation of step S27.

If the group which the object-of-CUE channel (c) belongs to is currently in the CUE-OFF state (NO determination at step S24), the CPU 10 goes to step S28 to set "0" to the CUE parameter for all of the other channels. Further, all of channels currently set in the CUE-ON state in the other existing group are set in the CUE-OFF state. Because, in the single CUE mode, only one channel is exclusively set in the CUE-ON state. In the mix CUE mode, all CUE-ON states in the other existing groups are cleared to prevent a mix CUE function from being performed between different groups.

At next step S29, the CPU 10 controls the delay and switching section 53 to switch the output signal of the monitoring analog output section 54 (operator monitor 20 of FIG. 1) from the monitoring signal to the CUE signal. In this manner, the audio signal of the channel (c) in question is output, as a test-listening signal of a different route from the main output signals 49 and 50, in response to the CUE-ON operation using the CUE switch 21*d* or fader knob 21*c*.

At following step S30, the CPU 10 sets the CUE status CS to a value (group number) corresponding to the group which the channel (c) in question belongs to (i.e., value "1" if the group is an input channel group, or "2" if the group is an output channel group). Then, the CPU sets the CUE parameter of the channel (c) in question in the ON state through the aforementioned operations of steps S25 to S27.

The CUE parameter of the channel in question, stored in the current memory, is set in the ON state through the operations of steps S26 and S27, in response to which the CUE switch 64 or 72 (CUE_ON) of the channel being processed in the DSP 15 is placed in the state for passing a signal. Further, when the fader use mode is the normal mode (FCM=0), the pre/post switching switch (pp) 62 or 72 of the channel being processed in the DSP 15 switches between the "a" and "b"

contacts in accordance with the pre/post parameter set in the current memory for the channel (c), so that a “pre-fader signal” or “post-fader signal” corresponding to the “a” or “b” contact is supplied to the CUE bus 46. Thus, the human operator can test-listen, via the operator monitor 20, to the pre-fader signal or post-fader signal of the channel (c), or a mixed signal of the pre-fader signals or post-fader signals of the individual channels of a group including the channel (c).

When the fader use mode is the fader CUE mode (FCM=1), the pre/post switching switch 62 or 72 (PP) of the channel (c) is switched compulsorily to the “Pre”, i.e. “a” contact, to thereby supply a “pre-fader signal” to the CUE bus 46. Thus, in the fader CUE mode, the human operator can test-listen, via the operator monitor 20, to the pre-fader signal of the channel (c), or a mixed signal of the pre-fader signals of the individual channels of the group including the channel (c). With the CUE function using the fader 17, there is employed an operating style in which the human operator CUEs a signal with the fader kept at a position near the lower end (i.e., –∞dB position in the normal mode) and then increases or raises the sound volume level of the signal by operating the fader knob in the upward direction, and thus, compulsorily switching the CUE signal to the pre-fader signal is a design suited for this operating style.

<CUE-OFF Process>

Figure 10:
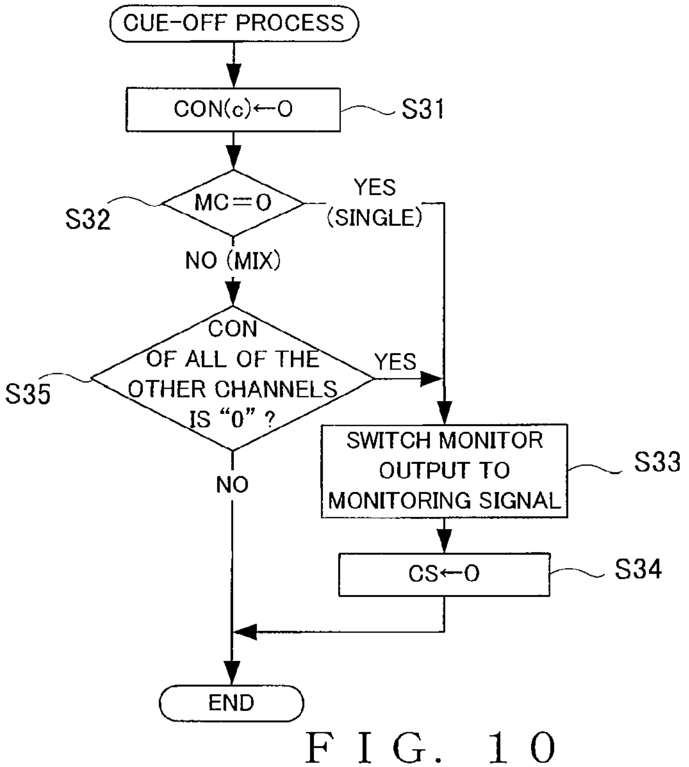
FIG. 10 is a flow chart explanatory of a CUE-OFF process.

FIG. 10 s a flow chart explanatory of the CUE-OFF process performed at step S4 and S22 above. At step S31, the CPU 10 sets the CUE parameter CON(c) of the channel (c) at the value “1” indicative of the CUE-OFF state. If the CUE mode MC is the “single mode” (YES determination at step S32), the CPU 10 goes to step S33 to control the delay and switching section 53 to switch the output signal of the section 53 back to the monitoring signal. Thus, the output signal of the monitoring analog output section 54 switches back to the monitoring signal. Then, the CPU 10 sets, at step S34, the CUE status CS at the value “0” indicative of the CUE-OFF state, after which the process is brought to an end.

If the CUE mode MC is the “mix mode” (NO determination at step S32), the CPU 10 goes to step S35, where it determines whether the CUE parameter CON of all of the other channels is “0”, i.e. whether any other channel is left set in the CUE-ON state. If there is no channel currently set in the CUE-ON state (YES determination at step S35), the CPU 10 executes steps S33 and S34 as above, after which the process is brought to an end. If there is any channel left set in the CUE-ON state (NO determination at step S35), the CPU 10 immediately terminates the process without performing any other operation.

At step S31, the CUE parameter of the channel (c) in question stored in the current memory is set in the OFF state, in response to which the CUE switch 64 or 72 (CUE_ON) of the channel (c), being subjected to signal processing in the DSP section, shuts off the signal and thus the signal supply to the CUE bus 46 is terminated.

According to the above-described digital audio mixer of the present invention, by the only performing operation for moving downward the electric fader 17 (fader knob 21*c*) of a desired channel against resistance force and then operating upwardly the fader knob 21*c*, the human operator can test-listen to a signal of the channel, then cancel the CUE-ON state of the channel and then adjust the sound volume level of the signal at the main output. Thus, the above-described embodiment advantageously allows the human operator to efficiently perform a series of operations of test-listening to a CUE signal of a given channel and then start adjustment of the sound volume level, at the main output, of the channel by only operating the fader control of the channel downwardly and upwardly.

<Modification of Resistance Force in the Fader CUE Mode>

As a modification of the resistance force to be generated against the electric fader 17 (fader knob 21*c*), force for returning the knob position to the second predetermined position T2 may be normally or constantly applied to the fader knob 21*c* as long as the knob position p is equal to or lower than the second predetermined position T2 (i.e., when FCS=1 or 2). According to this modification, the channel (c) in question can be set in the CUE-ON state only while the human operator is applying downward force to the fader knob 21*c* against the resistance force, and the position of the fader knob 21*c* automatically returns to the second predetermined position T2 unless the human operator is applying downward force to the fader knob 21*c*. In such a modification too, it is preferable that the force for returning the fader knob 21*c* to the second predetermined position T2 be slightly reduced when the position p has lowered below the predetermined first position T1. In this way, the human operator can recognize, from a decrease of reactive force acting on his or her finger, that the operating position p of the fader knob 21*c* has entered the CUE-ON setting range (i.e., range lower than the predetermined first position T1).

Whereas each of the input channels, MIX buses 45, output channels and CUE buses has been described as being constructed as a monaural component, it may be constructed as a stereophonic component. In such a case, the monitoring selector 51, monitoring mixer section 52 and delay and switching section 53 too are constructed as stereophonic components. Further, the digital audio mixer of the present invention may be constructed as a 5.1-channel or 7.1-channel mixer, or a mixer having any other greater number of channels than two channels. Namely, the digital audio mixer of the present invention can be constructed as a stereo digital audio mixer or a multi-channel digital audio mixer.

Furthermore, the mixer of the present invention has been described as constructed in such a manner that, when there is any channel currently set in the CUE-ON state, an output signal of the delay and switching section 53 is switched to a CUE signal so that a signal of the CUE bus is output from the monitoring analog output section 54. As a modification of the present invention, however, a CUE-only output section may be provided in such a manner that an output signal of the CUE bus is always output to the CUE-only output section.

This application is based on, and claims priority to, JP PA 2010-065242 filed on 19 Mar. 2010. The disclosure of the priority applications, in its entirety, including the drawings, claims, and the specification thereof, are incorporated herein by reference.

What is claimed is:

1. A digital audio mixer comprising:

a plurality of channels each of which controls a level of a supplied audio signal on a basis of a level parameter and outputs the level-controlled audio signal;

a plurality of fader controls to which are allocated the plurality of channels, on channel per fader control, each of said fader controls being slidingly operable one-dimensionally from a first end to a second end of a movable range thereof and drivable on a basis of a drive signal;

a level change section which, in response to a position of each of said fader controls, changes a value of the level parameter of a channel, allocated to the fader control, in such a manner that the value of the level parameter of the channel becomes greater as the position of the fader control approaches said first end and becomes smaller as the position of the fader control approaches said second end, wherein the value of the level parameter at the second end is set to a zero level value;

a mixing bus which mixes a plurality of audio signals output from the plurality of channels to thereby output a resultant mixed audio signal;

a main output section which outputs, to outside said digital audio mixer, the resultant mixed audio signal output from said mixing bus;

a monitoring output section which outputs an audio signal designated as a cue signal;

a resistance force generation section which, once any one of said fader controls is operated toward said second end within a predetermined range provided near said second end, drives the one fader control on the basis of the drive signal to thereby generate resistance force against operation of the one fader control, wherein said level change section changes the value of the level parameter within a range closer to said first end than the predetermined range and maintains the value of the level parameter at the zero level value as long as the position of the fader control is within a range from the predetermined range to said second end;

a first control section which, once any one of said fader controls is operated toward said second end beyond the predetermined range, designates, as the cue signal, the audio signal of the channel allocated to the one fader control; and a second control section which, once any one of said fader controls is operated toward said first end beyond the predetermined range, cancels designation, as the cue signal, of the audio signal of the channel allocated to the one fader control.

2. The digital audio mixer as claimed in claim 1, which further comprises:

a plurality of cue switches to which are allocated the channels, one channel per cue switch; and a third control section which, in response to operation of any one of the cue switches, designates, as the cue signal, the audio signal of the channel allocated to the one cue switch if the audio signal of the channel allocated to the one cue switch is not currently designated as the cue signal, but cancels designation, as the cue signal, of the audio signal of the channel allocated to the one cue switch if the audio signal of the channel allocated to the one cue switch is currently designated as the cue signal.

3. A digital audio mixer comprising:

a plurality of input channels each of which controls a level of a supplied audio signal on the basis of a level parameter and outputs the level-controlled audio signal;

a plurality of fader controls slidingly operable one-dimensionally from a first end to a second end of a movable range thereof and drivable on the basis of a drive signal;

a level change section which, in response to a position of each of fader controls, changes a value of the level parameter of a channel, allocated to the fader control, in such a manner that the value of the level parameter of the channel becomes greater as the position of the fader control approaches said first end and becomes smaller as the position of the fader control approaches said second end, wherein the value of the level parameter at the second end is set to a zero level value;

a plurality of mixing buses each of which mixes a plurality of audio signals output from the plurality of channels to thereby output a resultant mixed audio signal;

a plurality of output channels corresponding to the plurality of mixing buses, each of the output channels controlling a level of the audio signal, supplied from a corresponding one of the mixing buses, on the basis of a level parameter and outputs the level-controlled audio signal, the output channels being allocated to said fader controls, one output channel per fader control;

a main output section which outputs, to outside said digital audio mixer, the audio signals output from said plurality of output channels;

a monitoring output section which outputs an audio signal designated as a cue signal;

a resistance force generation section which, once any one of said fader controls is operated toward said second end within a predetermined range provided near said second end, drives the one fader control on the basis of the drive signal to thereby generate resistance force against operation of the one fader control, wherein said level change section changes the value of the level parameter within a range closer to said first end than the predetermined range and maintains the value of the level parameter at the zero level value as long as the position of the fader control is within a range from the predetermined range to said second end;

a first control section which, once any one of said fader controls is operated toward said second end beyond the predetermined range, designates, as the cue signal, the audio signal of the channel allocated to the one fader control; and a second control section which, once any one of said fader controls is operated toward said first end beyond the predetermined range, cancels designation, as the cue signal, of the audio signal of the channel allocated to the one fader control.

4. A digital audio mixer comprising:

a plurality of channels each of which controls a level of a supplied audio signal on the basis of a level parameter and outputs the level-controlled audio signal;

a plurality of fader controls to which are allocated the plurality of channels, on channel per fader control, each of said fader controls being slidingly operable one-dimensionally from a first end to a second end of a movable range thereof and drivable on the basis of a drive signal;

a level change section which, in response to a position of each of said fader controls, changes a value of the level parameter of a channel, allocated to the fader control, in such a manner that the value of the level parameter of the channel becomes greater as the position of the fader control approaches said first end and becomes smaller as the position of the fader control approaches said second end, wherein the value of the level parameter at the second end is set to a zero level value;

a mixing bus which mixes a plurality of audio signals output from the plurality of channels to thereby output a resultant mixed audio signal;

a plurality of cue switches to which are allocated the channels, one channel per cue switch;

a designation control section which, in response to operation of any one of the cue switches, designates, as the cue signal, the audio signal of the channel allocated to the one cue switch if the audio signal of the channel allocated to the one cue switch is not currently designated as the cue signal, but cancels designation, as the cue signal, of the audio signal of the channel allocated to the one cue switch if the audio signal of the channel allocated to the one cue switch is currently designated as the cue signal;

a monitoring output section which outputs an audio signal designated as the cue signal;

a mode selection section which selects any one of a first mode and a second mode;

a resistance force generation section which, once any one of said fader controls is operated toward said second end within a predetermined range, provided near said second end, while said second mode is selected, drives the one fader control on the basis of the drive signal to thereby generate resistance force against operation of the one fader control;

a first control section in operation while said second mode is selected, which, once any one of said fader controls is operated toward said second end beyond the predetermined range, designates, as the cue signal, the audio signal of the channel allocated to the one fader control; and a second control section in operation while said second mode is selected, which, once any one of said fader controls is operated toward said first end beyond the predetermined range, cancels designation, as the cue signal, of the audio signal of the channel allocated to the one fader control, wherein, while said first mode is selected by said mode selection section, said level change section progressively changes the value of the level parameter within a range from a maximum level value to a zero level corresponding to an entire range from said first end to said second end said level change section, but, while said second mode is selected, said level change section progressively changes the value of the level parameter in response to the operating position of the fader control as long as the operating position of the fader control is within a range closer to said first end than the predetermined range and maintains the value of the level parameter at a zero level value as long as the operating position of the fader control is within a range from the predetermined range to said second end.

* * * * *